March 26, 1946.  J. H. COX ET AL  2,397,089
VAPOR-ELECTRIC SYSTEM
Filed Aug. 8, 1942
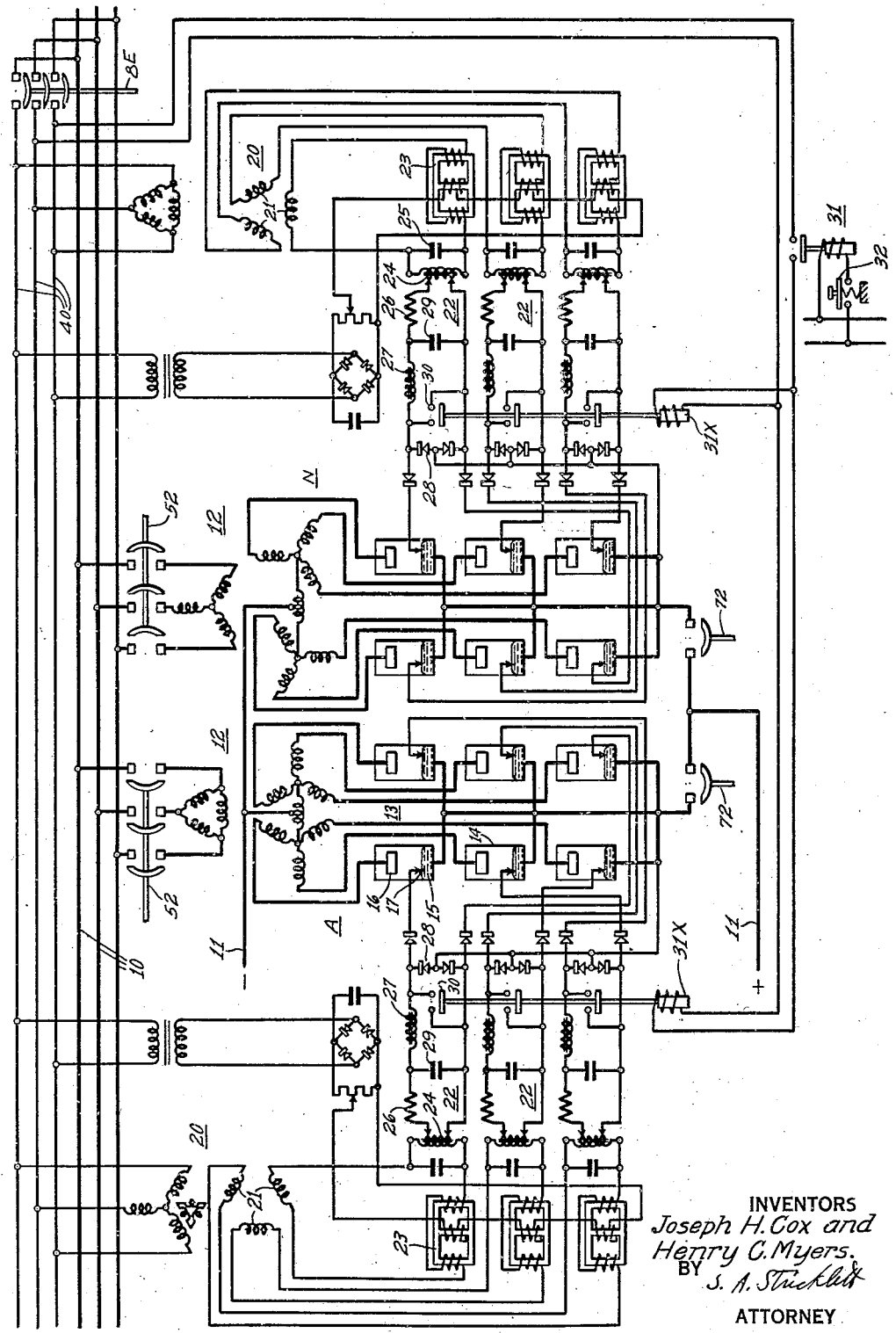
INVENTORS
Joseph H. Cox and
Henry C. Myers.
BY
S. A. Stricklett
ATTORNEY Patented Mar. 26, 1946

2,397,089

UNITED STATES PATENT OFFICE 2,397,089

VAPOR-ELECTRIC SYSTEM

Joseph H. Cox, Forest Hills, and Henry C. Myers, Irwin, Pa., assignors to Westinghouse Electric Corporation, East Pittsburgh, Pa., a corporation of Pennsylvania Application August 8, 1942, Serial No. 454,157

4 Claims. (Cl. 315—146)

Our invention relates to a vapor electric converter, and particularly to a control system for simultaneously connecting a plurality of converters between an alternating current supply circuit and a direct current load circuit requiring a large amount of power.

In the application of converters to supply large blocks of power, such as required by electromechanical load systems, from an alternating current supply circuit, it has been found most economical and advantageous to utilize a relatively large number of converters of normal capacity to consummate the conversion. This is particularly advantageous when one or more of the converter units may be out of service while the remainder of the units will carry the substantially full load without dangerous overloading. This is particularly true when vapor electric converters are utilized because of the relatively large overload capacity of the individual units where one or more of the units may be shut down for relatively long periods of time without any disadvantageous results.

Heretofore when rotary converters were utilized as the conversion elements, it was customary to bring up all of the converters and connect them to a station bus at no load, and then to use a single master switch of sufficient capacity for connecting the station bus to the load bus. When utilizing vapor electric converters, this system has had little if any advantage and it has heretofore been proposed to bring the converters into service by connecting all of the power switches, both on the alternating current and direct current side of the converters and then starting current flow by energizing all of the excitation systems simultaneously. Considerable difficulty has been experienced in getting all of the units onto the bus because of minute differences in the units and because of transients set up in the excitation systems, whereby one or more of the units will assume load ahead of the remaining units, and because of the resultant overload these units will trip out and as succeeding units come on the line they will also trip out because of the overload. Since the almost universal acceptance of the so-called reactor firing system or wave distorting impulsing circuits for exciting vapor electric devices, and because these wave distorting impulsing systems are essentially composed of a large number of impedances of various types, the initial transients are very unpredictable.

It is an object of our invention to provide a means for simultaneously securing excitation to all units of a conversion system having a large number of parallel operating converters excited by the so-called reactor firing systems. We secure this result by applying potential to the exciting system and short-circuiting the exciting electrodes so that no potential flows from the exciting system to the make-alive electrodes then connecting all of the alternating current breakers and direct current breakers of the system to the alternating current bus and the load bus, respectively, and after a sufficient interval, to dispose of the transients set up by energizing the excitation circuits, the short-circuiting contacts are opened, allowing the excitation current to flow simultaneously to all of the make-alive electrodes and thereby simultaneously start current flow in all of the units of the conversion system.

It is a further object of our invention to provide a control system for short-circuiting the make-alive electrodes of a conversion system.

It is a further object of our invention to provide a master control system for simultaneously energizing a plurality of parallel operating converters.

It is a further object of our invention to provide a master control system for simultaneously connecting a plurality of converters to a load bus.

Other objects and advantages of our invention will be apparent from the following detailed description taken in conjunction with the accompanying drawing, in which the figure is a schematic illustration of a conversion system according to our invention.

In the illustrated embodiment of our invention, an alternating current circuit 10 is connected to a direct current load circuit 11 requiring the application of a large amount of direct current power. The alternating current circuit 10 is connected to the load circuit by means of suitable converter transformers 12 and the energy flow through each transformer 12 is controlled by an associated vapor electric conversion unit herein shown as two units A and N for purpose of simplicity while it may be understood that a large number of such units A and N are involved.

Each of the conversion units comprises a plurality of pairs of alternating conducting vapor electric valves 13, each valve comprising a suitble evacuated container 14 having a vaporizable reconstructing cathode 15 of suitable material such as mercury and a cooperating anode 16. The excitation for each pair of alternately conducting valves 13 comprises a suitable source of alternating current of the same frequency as the potential supplied by the alternating current circuit 10, and, for convenience, we have shown the source of potential as a transformer 20 energized through a control switch 8E from the alternating current circuit 10.

Each winding 21 of the source 20 of exciting potential is connected to a make-alive electrode 17 in each of the pair of valves 13 by means of a so-called reactor firing or wave distorter network 22. This network usually comprises a phase control system utilizing a variable reactor 23 connected in series with the source of potential 21, a saturable reactor 24 and a suitable capacitor 25 connected in parallel with the source 21 and the series variable reactor 23. This network, if the constants are properly chosen, not only provides a device for shifting the phase of the control potentials but also provides a constant potential network for the reactor firing system proper which comprises a capacitor 29 connected across the terminals of the phase shifting, constant potential network and provided with a suitable impedance 26 usually in the form of a linear reactor to control current flow from the source to the capacitor 29.

Current flow from the capacitor 29 to the make-alive electrodes 17 is controlled by means of a non-linear impedance usually in the form of a saturable reactor 27. In order to properly apply the output potential of the saturable reactor 27, a polarity responsive network 28 is usually interposed between the terminals of the wave distorter system 22 and the make-alive electrodes 17.

A short-circuiting switch 30 is provided for each pair of make-alive electrodes, and all of the short-circuiting switches 30 are simultaneously actuated by means of a control switch 31 operated by a master control relay 32.

In placing the units A to N in simultaneous operation, the control circuit 40 is energized by closing the main excitation switch 8E, then the master relay 32 is operated to energize contactor 31 which energizes the relays 31X which closes their contacts 30 and short circuits all of the make-alive electrodes 17. All of the alternating current breakers 52 are then closed, as well as the direct current breakers 72. After a sufficient interval to allow the excitation circuits 22 to reach a steady operating state, the master relay 32 is opened, allowing contactor 31 to open, deenergizing relays 31X, which drop out contacts 30 simultaneously, and permits excitation current to flow from the excitation networks 22 to the make-alive electrodes 17, so that all units A to N are simultaneously energized and current flow begins through all units A to N of the system.

While, for purposes of illustration, we have shown and described a specific embodiment of our invention, it will be apparent that changes and modifications can be made therein without departing from the true spirit of our invention or the scope of the appended claims.

We claim as our invention:

1. A vapor-electric converter system for transferring large blocks of power between two dissimilar electric circuits one of which is a polyphase alternating current circuit comprising a plurality of substantially independent parallel connected converter units, each unit including polyphase transformer means for providing a plurality of phase terminals, a vapor electric valve connected to each of said phase terminals, each valve having a main anode, a cathode and a make-alive electrode, an alternating current breaker and a direct current breaker for each unit, a wave distorter firing system for each unit, a source of control potential for all of said firing systems, contact means for short-circuiting the output terminals of all of said firing systems and means for operating said contact means for simultaneously removing the short circuits from all of said firing systems after said systems have reached a steady operating condition.

2. An electric current conversion system for transferring large blocks of power between an alternating current circuit and a direct current circuit comprising a plurality of substantially independent parallel connected conversion units interconnecting said circuits, each unit including transformer means providing a plurality of phase terminals and at least an electric valve for each phase terminal, a circuit interrupter between each unit and the alternating current circuit, a circuit interrupter between each unit and the direct current circuit, independent control systems for each unit of said converter, said control systems including impedance networks for impressing control impulses on the valves of said units, relay means for short-circuiting the output terminals of said control systems, a common energizing circuit for all of said control systems and means for simultaneously removing the short circuits from all of said control systems.

3. A conversion system for transferring large amounts of power between two dissimilar circuits one of which is a polyphase supply circuit comprising a plurality of multi-valve converters, an excitation system for each of said converters, said excitation systems being of the type subject to transients when first energized, means for energizing all of the excitation circuits, switching means for short circuiting the output terminals of said excitation systems and a master relay for simultaneously operating all of said switching means after said excitation systems have reached a steady operating condition.

4. An electric conversion system comprising a plurality of parallel operating vapor-electric converters, each converter including a plurality of electric valves, each valve including a main anode, a cathode and a make-alive electrode, a substantially independent control system for each of said converters, said control system being subject to transient disturbances when first energized, means for energizing said control systems, switching means for maintaining the make-alive electrodes inoperative while applying substantially full load to said control systems and means for simultaneously rendering the make-alive electrode operative after said control systems have reached a steady operating condition.

JOSEPH H. COX.
HENRY C. MYERS.